(12) United States Patent
Benson

(10) Patent No.: US 10,107,136 B2
(45) Date of Patent: Oct. 23, 2018

(54) BLADE

(71) Applicant: ROLLS-ROYCE plc, London (GB)

(72) Inventor: Christopher Benson, Swindon (GB)

(73) Assignee: ROLLS-ROYCE plc, London (GB)

( * ) Notice: Subject to any disclaimer, the term of this patent is extended or adjusted under 35 U.S.C. 154(b) by 117 days.

(21) Appl. No.: 14/954,087

(22) Filed: Nov. 30, 2015

(65) Prior Publication Data

US 2016/0177779 A1    Jun. 23, 2016

(30) Foreign Application Priority Data

Dec. 19, 2014 (GB) .................................. 1422741.7

(51) Int. Cl.
| | |
|---|---|
| *F01D 5/14* | (2006.01) |
| *F01D 21/04* | (2006.01) |
| *F01D 5/28* | (2006.01) |
| *F02C 7/05* | (2006.01) |

(52) U.S. Cl.
CPC ........... *F01D 21/045* (2013.01); *F01D 5/147* (2013.01); *F01D 5/282* (2013.01); *F02C 7/05* (2013.01); *F05D 2220/32* (2013.01); *F05D 2240/303* (2013.01); *F05D 2260/311* (2013.01); *F05D 2300/10* (2013.01)

(58) Field of Classification Search
USPC .................................. 416/2, 92, 224; 415/9
See application file for complete search history.

(56) References Cited

U.S. PATENT DOCUMENTS

| | | | |
|---|---|---|---|
| 4,111,600 A | 9/1978 | Rothman et al. | |
| 4,944,655 A | 7/1990 | Merz | |
| 7,780,410 B2 | 8/2010 | Kray et al. | |
| 8,814,527 B2 | 8/2014 | Huth et al. | |
| 2008/0075601 A1 | 3/2008 | Giusti et al. | |
| 2010/0054937 A1* | 3/2010 | Beckford | F01D 5/14 416/2 |
| 2010/0054945 A1 | 3/2010 | McMillan et al. | |
| 2012/0301292 A1 | 11/2012 | Deal et al. | |
| 2013/0004323 A1* | 1/2013 | Hansen | B23P 9/04 416/224 |
| 2013/0008027 A1 | 1/2013 | Franchet et al. | |
| 2013/0199934 A1* | 8/2013 | Parkos, Jr. | C25D 1/02 205/50 |
| 2013/0239586 A1* | 9/2013 | Parkin | F01D 5/147 60/805 |
| 2015/0218953 A1 | 8/2015 | Bottome | |

FOREIGN PATENT DOCUMENTS

| | | |
|---|---|---|
| EP | 1 022 432 A2 | 7/2000 |
| EP | 1 754 857 A2 | 2/2007 |

(Continued)

OTHER PUBLICATIONS

Jun. 7, 2016 Search Report issued in European Patent Application No. 15196977.

(Continued)

*Primary Examiner* — Igor Kershteyn
*Assistant Examiner* — Theodore Ribadeneyra
(74) *Attorney, Agent, or Firm* — Oliff PLC

(57) ABSTRACT

A turbomachine blade comprising a metallic leading edge having a weakened region extending in a spanwise direction; and a crack initiator for selectively initiating cracking of the metallic leading edge along the weakened region.

12 Claims, 5 Drawing Sheets

(56) References Cited

FOREIGN PATENT DOCUMENTS

| | | | |
|---|---|---|---|
| EP | 2 159 378 A2 | 3/2010 | |
| FR | 2 994 708 A1 | 2/2014 | |
| FR | 2994708 A1 * | 2/2014 | ............. F01D 9/041 |

OTHER PUBLICATIONS

May 30, 2016 Search Report issued in European Patent Application No. 15196975.
Jun. 15, 2015 Search Report issued in British Patent Application No. GB1422741.7.
Jun. 15, 2015 Search Report issued in British Patent Application No. GB1422737.5.
Jun. 16, 2015 Search Reoprt issued in British Patent Application No. GB1422738.3.
U.S. Appl. No. 14/954,355, filed Nov. 30, 2015 in the name of Christopher Benson.
U.S. Appl. No. 14/954,221, filed Nov. 30, 2015 in the name of Christopher Benson.
Jun. 1, 2018 Notice of Allowance issued in U.S. Appl. No. 14/954,221.
Oct. 19, 2017 Office Action issued in U.S. Appl. No. 14/954,221.
Nov. 2, 2017 Office Action issued in U.S. Appl. No. 14/954,355.
Jul. 25, 2018 Office Action issued in U.S. Appl. No. 14/954,355.

* cited by examiner

BLADE

FIELD OF INVENTION

The present invention relates to a turbomachine blade, in particular but not exclusively a fan blade for a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven directly off an additional lower pressure turbine in the engine core.

A fan of the gas turbine engine generally includes a plurality of blades mounted to a hub. A fan casing and liner circumscribe the fan blades. Fan blades may be metallic or have a composite construction. Generally a composite fan blade will have a composite non-metallic core, e.g. a core having fibres within a resin matrix. Typically a composite blade will have a metallic leading edge to prevent erosion and to protect the blade against impact damage from foreign objects. The metallic leading edge generally wraps around the leading edge of the composite core and covers a portion of the suction surface of the blade and a portion of the pressure surface of the blade.

In the event of the leading edge becoming detached from the remainder of the fan blade (e.g. if a fan blade is released from the hub), the construction of the leading edge means that it can apply high impact forces to the fan casing. The fan casing and liner can be designed to absorb the impact energy imparted by a released blade and leading edge. However, this generally leads to a heavy system that has associated efficiency penalties.

SUMMARY OF INVENTION

A first aspect of the invention provides a turbomachine blade comprising a metallic leading edge having a weakened region extending in a spanwise direction; and a crack initiator for selectively initiating cracking of the metallic leading edge along the weakened region.

The blade may have a leading edge and a trailing edge; and a suction surface extending between the leading edge and the trailing edge and a pressure surface extending between the leading edge and the trailing edge. In the present application, a chordwise direction is a direction extending between the leading edge and the trailing edge; a spanwise direction is a direction extending between the tip of the blade and the root of the blade; and the thickness direction is a direction extending between the pressure surface and the suction surface of the blade.

The crack initiator may be provided at the tip of the blade.

The crack initiator may be a weakened region that is more susceptible to cracking than the remainder of the metallic leading edge.

The crack initiator may comprise a leading edge cap positioned at the blade tip.

The cap may be a wedge shaped insert having a reduced width in a direction from the blade tip towards the blade root, width being measured in a direction from a pressure side to a suction side of the blade.

The wedge shaped insert may comprise planar sides angled to reduce the width of the insert.

Alternatively, the sides may be curved. For example, the sides may be curved towards a convergent point.

The angle or curve of the sides and/or the length of the insert can be selected to achieve the desired failure mechanism.

The insert may be shaped to converge towards the weakened region.

The cap may be bonded to the leading edge. For example, the cap may be bonded using adhesive or a metal joining process such as welding. Additionally or alternatively, the cap may be mechanically attached to the leading edge. For example, using fasteners and/or shear pins.

The strength and/or type of bonding or connection between the cap and the leading edge can be selected to achieve the desired failure mechanism.

The cap may include shoulders that are arranged such that in a non-failure condition the shoulders rest on a region of the metallic leading edge. The shoulders may be configured so as to shear from the remainder of the cap when a predetermined impact force is applied to the cap.

The metallic leading edge may be formed of at least two parts and the weakened region may be a bondline between said two parts of the metallic leading edge.

The crack initiator may be entirely contained within a region defined by the metallic leading edge.

The leading edge may include two wings and a fore portion positioned between said two wings.

The blade may comprise a composite core to which the leading edge is attached.

The blade may be a fan blade for a gas turbine engine.

A second aspect of the invention provides a gas turbine engine comprising the blade according to the first aspect.

DESCRIPTION OF DRAWINGS

The invention will now be described, by way of example only, with reference to the accompanying drawings in which.

DETAILED DESCRIPTION

Figure 1:
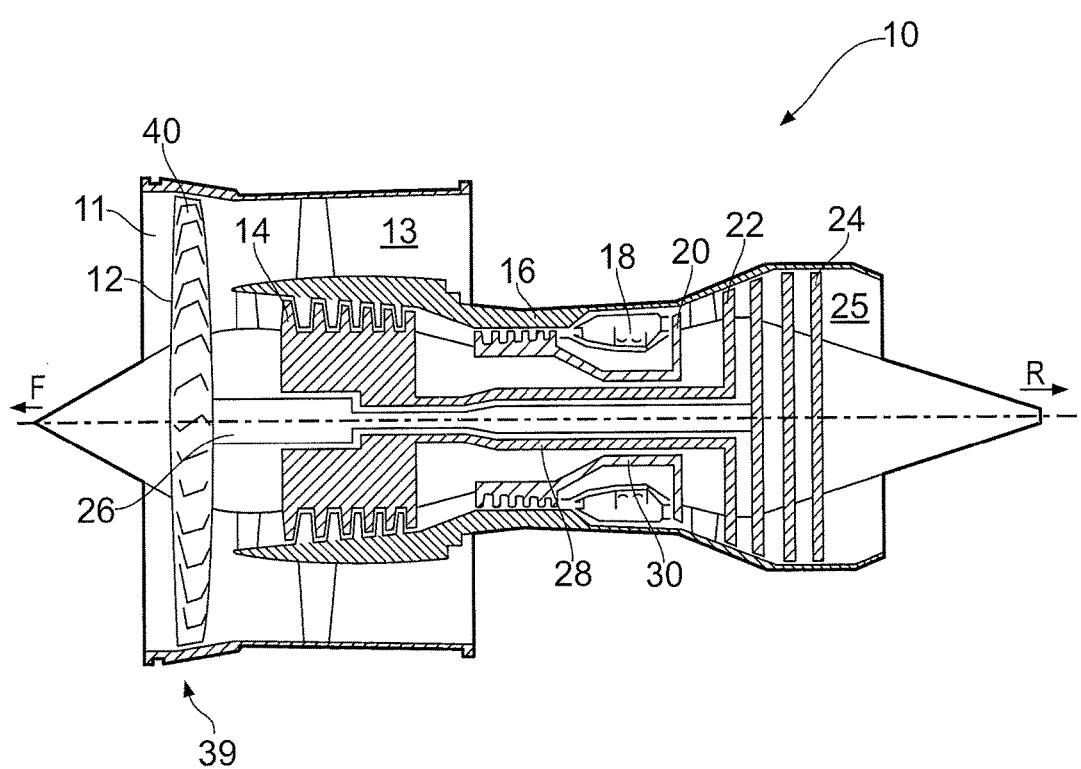
FIG. 1 illustrates a gas turbine engine.

With reference to FIG. 1 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. The fan blades are circumscribed by a fan casing 39. The fan casing includes a liner proximal to the fan blades.

In the present application a forward direction (indicated by arrow F in FIG. 3) and a rearward direction (indicated by arrow R in FIG. 3) are defined in terms of axial airflow through the engine 10.

Figure 2:
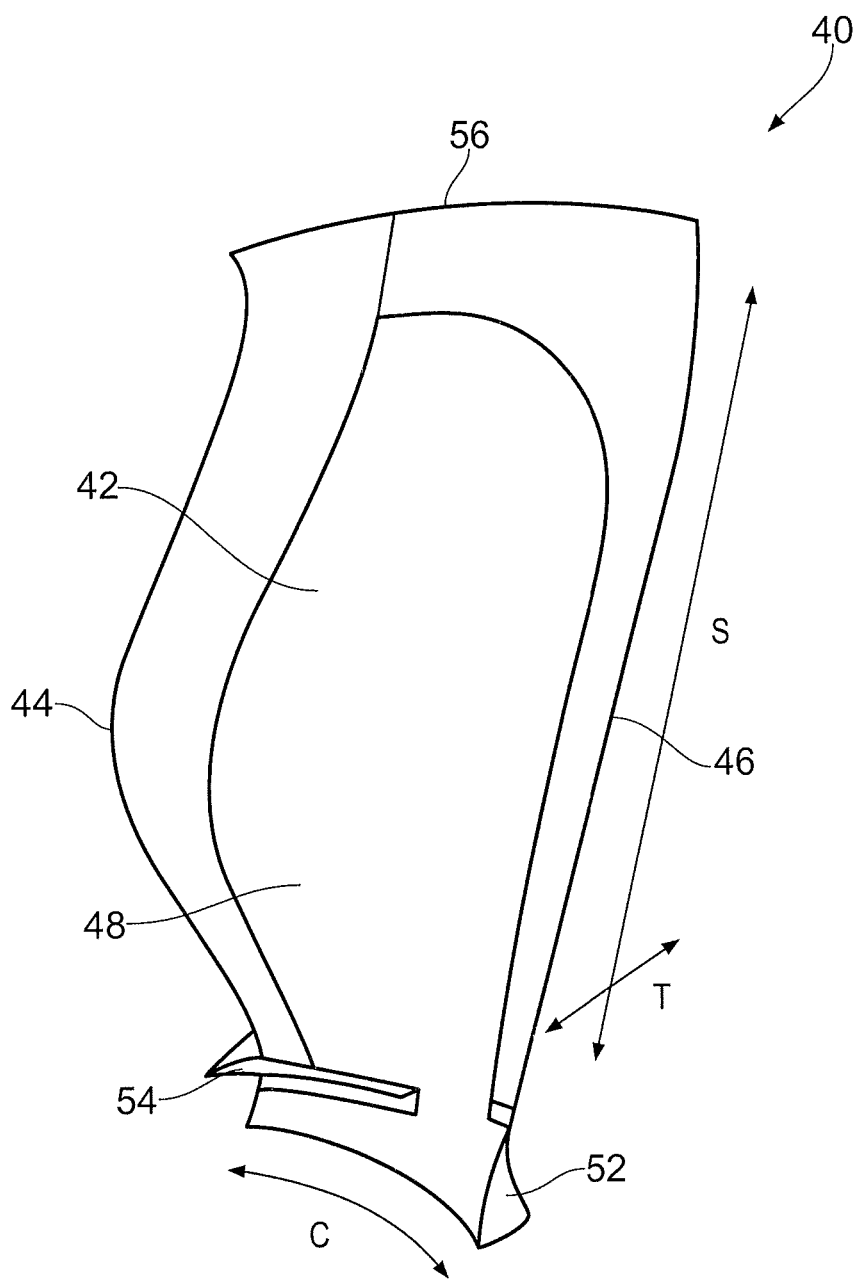
FIG. 2 illustrates a composite fan blade.

Referring to FIG. 2, the fan blades 40 each comprise an aerofoil portion or core 42 having a leading edge, a trailing edge 46, a concave pressure surface 48 extending from the leading edge to the trailing edge and a convex suction surface (not shown in FIG. 2 but indicated at 50 in FIG. 3) extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge 44 covering the leading edge of the core and extending along a portion of the pressure surface and suction surface of the core. The fan blade also includes a metallic trailing edge covering the trailing edge of the core and extending along a portion of the pressure surface and the suction surface of the core.

In the present application, a chordwise direction C is a direction extending between the leading edge and the trailing edge; a spanwise direction S is a direction extending between the tip of the blade and the root 52 of the blade 40; and the thickness direction T is a direction extending between the pressure surface 48 and the suction surface 50 of the blade 40.

Figure 3:
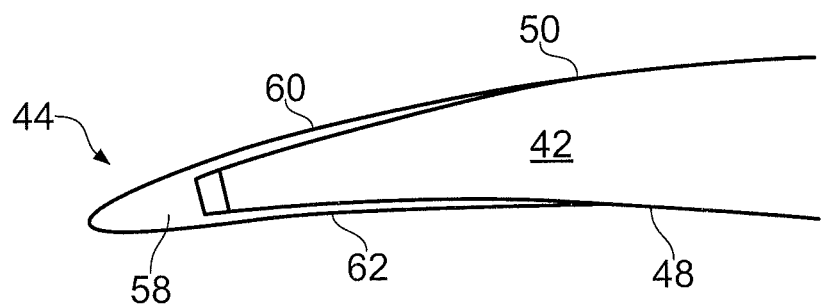
FIG. 3 illustrates a partial cross section of the composite fan blade of FIG. 2.

Referring now to FIG. 3, the metallic leading edge includes a fore portion 58 provided between two wings 60, 62. One of the wings 60 extends partially along the suction side of the core 42 and the other of the wings 62 extends partially along the pressure side of the core.

Figure 4:
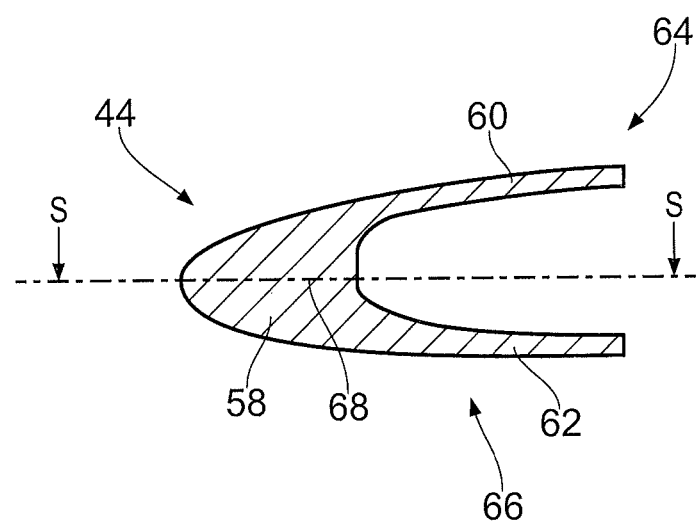
FIG. 4 illustrates a cross section of a metallic leading edge of the composite fan blade of FIG. 2.

Referring to FIG. 4, in the present embodiment the metallic leading edge is formed of a first part 64 and a second part 66 connected together in a region of the fore portion. Each of the first part and the second part form one wing 60, 62 and a section of the fore portion 58. In the present embodiment, the first part and the second part connect in a central region of the fore portion. The first part and the second part are bonded together along a bondline 68.

A crack initiator is provided to selectively activate cracking or splitting of the metallic leading edge, for example in the event of the fan blade being released during use of the engine. The crack initiator may be provided at the tip of the leading edge.

In exemplary embodiments, the crack initiator is a locally weakened region at the tip of the leading edge 44. That is, the fracture resistance at the tip of the leading edge is less than the fracture resistance in any region in the remainder of the leading edge.

Figure 5:
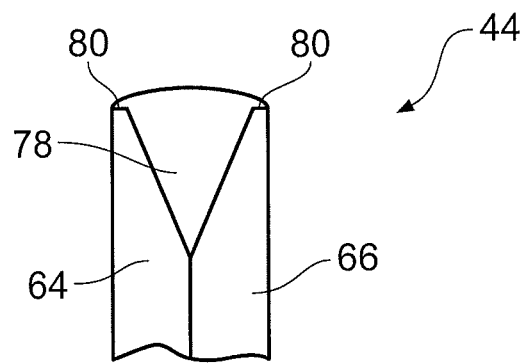
FIG. 5 illustrates a partial cross section of a crack initiator provided at the tip of a metallic leading edge of the fan blade of FIG. 2.
Figure 6:
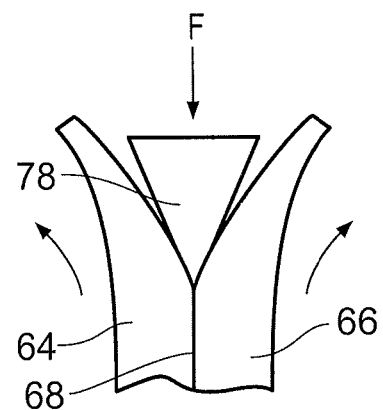
FIG. 6 illustrates a partial cross section of the crack initiator and metallic leading edge of FIG. 5 in the event of the leading edge impacting a fan casing or liner.

Referring to FIGS. 5 and 6, in alternative exemplary embodiments the crack initiator is a cap 78 provided at the tip of the leading edge 44. The cap defines a wedge shaped insert. The wedge shaped insert has increased width at the tip 56 of the blade than in a region towards the blade root 52. Width is measured in the thickness direction. The insert tapers to a point substantially coincident with the bondline 68 connecting the first and second parts 64, 66. The sides of the insert are planar and angled towards the bondline. However, in alternative embodiments the sides of the insert may be curved towards the bondline. The cap optionally includes shoulders 80 that rest on the first and second parts of the leading edge.

In the event of a blade 40 being released from the fan 12, the fan blade will impact the liner of the casing. Said impact force (indicated by arrow F in FIG. 6) loads the cap 78 to drive the cap down along the bondline 68 between the first and second parts so as to initiate cracking or splitting of the leading edge 44 along the bondline.

In the described embodiment the cap 78 extends along the chordal length of the fore portion of the leading edge 44 but not beyond the extent of the metallic leading edge. However, in alternative embodiments the cap may extend from the leading edge to the trailing edge 46, or any distance therebetween. When the cap extends to a region of the composite core 42, the cap can be used to initiate splitting of the composite ply layers so as to assist collapse of the entire fan blade 40.

The cap 78 may be bonded to the first and second parts 64, 66 of the leading edge. For example, the cap may be welded to the first and second parts or attached using an adhesive. In alternative embodiments or additionally the cap may be connected using a mechanical fastener such as one or more shear pins. The strength of the bond between the cap and the first and second parts and the shape of the cap can be used to control the impact force required to initiate cracking or splitting of the leading edge.

For example, the angle of the wedge or the spanwise length of the insert can be used to vary the impact force F required to initiate cracking of the leading edge 44.

The strength of the attachment between the cap 78 and the first part 64 and the second part 66 should be selected so that cracking is only initiated in the event of a fan blade being released from the fan and not during other impact events the fan blades 40 experience. The shoulders 80 provided on the cap can help to regulate the impact force F required to initiate cracking. The shoulders can be configured to shear off under the impact loads experienced when a fan blade is released. In embodiments utilising shear pins, the shear pins can similarly be used to regulate the impact force F required to initiate cracking.

The leading edge can be further modified if desired to modify the bondline such that the fracture resistance of the bondline 68 varies in a radial direction from a position near the blade root to a position near the blade tip. For example, the fracture resistance may be progressively varied along the length (in a spanwise direction) of the metallic leading edge 44.

In exemplary embodiments, the fracture resistance near the blade root 52 is less than the fracture resistance near the blade tip 56, but in alternative exemplary embodiments the fracture resistance near the blade tip may be less than the fracture resistance near the blade root.

The fracture resistance can be varied by introducing a pattern of one or more bonded areas and one or more non-bonded areas along the bondline, e.g. at the interface between the first part and the second part. For example, in the region near the tip the percentage of area of the first part bonded to the second part may be greater than in a region near the root. When designing the bond strength along the length of the leading edge (including where applicable the pattern of bonded and non-bonded areas) the bond strength should be configured so that the leading edge can withstand impacts that occur during flight, for example foreign object impact. Varying the fracture resistance of the metallic leading edge means that the leading edge can "unzip" under applied local shear, tension and compressive forces resulting from the globally applied bending force applied to the leading edge during impact with the liner of the casing.

Figure 7:
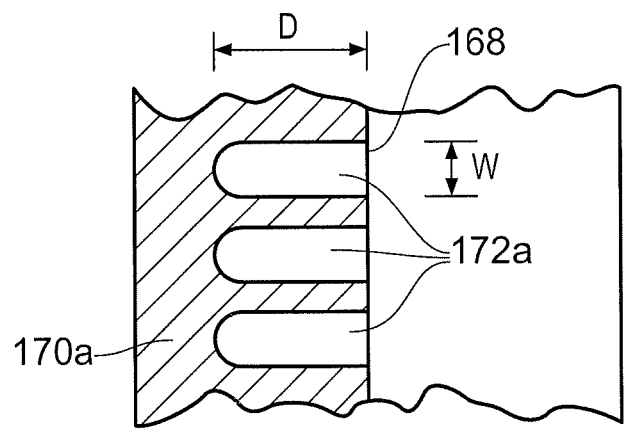
FIG. 7 illustrates a partial section view of the metallic leading edge of FIG. 4 along the line S-S at a position near the tip of the fan blade.
Figure 8:
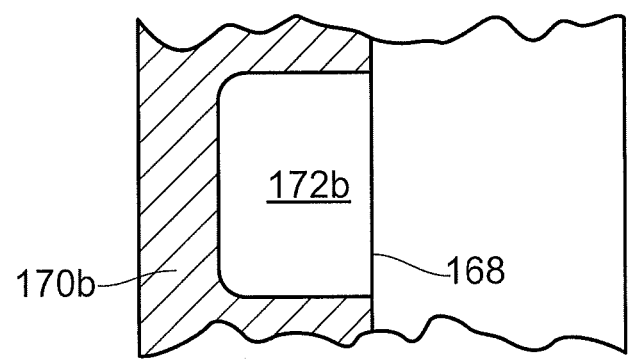
FIG. 8 illustrates a partial section view of the metallic leading edge of FIG. 4 along the line S-S at a position near the root of the fan blade.

Referring to FIGS. 7 and 8, the bondline in a region near the tip (illustrated in FIG. 7) and the bondline in a region near the root (illustrated in FIG. 8) can be compared. The bondline 168 in a region near the tip includes a bonded area 170a and a plurality of non-bonded areas 172a. The bondline 168 in a region near the root has a bonded area 170b and a non-bonded area 172b. The non-bonded area 172b near the root is larger than the non-bonded area 172a near the tip. The width W (in a radial or spanwise direction) and the depth D (in an axial or chordwise direction) of the non-bonded area can be altered to increase the non-bonded area.

To manufacture a blade 40 of the described embodiment, the first part and the second part may be made using additive manufacture, machining from solid or any suitable metal forming method. The first part may be bonded to the second part using welding, e.g. electron beam welding, or diffusion bonding. In the case of electron beam welding, the bonded and non-bonded areas can be formed by controlling the electron beam welding power. In the case of diffusion bonding, a ceramic (e.g. yttria) bond mask can be used to cover the non-bonded areas along the bondline.

As will be appreciated by the person skilled in the art, the pattern of the bonded and non-bonded areas may be varied from that illustrated. For example, the non-bonded areas may have a circle or oval shape rather than a slot shape. The size of the circle or oval shape may vary along the length of the leading edge. Further alternative embodiments may have non-bonded areas of shapes that form a cluster with stippling or graduated in size, in yet further alternative embodiments a pattern of tessalating bonded and non-bonded areas may be provided.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, in the described embodiments the leading edge is manufactured in two parts that are bonded together. However, in alternative embodiments the leading edge may be made as a single component. When the leading edge is manufactured as a single component the leading edge may be manufactured using additive layer manufacture and the weakened regions may be provided by including voids or cavities in the leading edge. Alternatively the single component may be made by a metal forming method and local heat treatment of the component may be used to tailor the fracture resistance in different regions of the leading edge, and/or holes or cavities may be provided to tailor the fracture resistance of different regions of the leading edge.

In the present application the leading edge has been shown as having two wings, but in alternative embodiments the leading edge may have a "bullet" shape, that is the leading edge may be substantially free from wings.

The fan blade described is a composite blade with a metallic leading edge. However, the leading edge may be a leading edge of a metallic blade, e.g. a solid metallic or a hollow metallic blade. In such embodiments, the leading edge may be integrally formed with the core of the blade.

In the described embodiments the wedge shaped insert is formed as a separate component to the leading edge, but in alternative embodiments the insert may be integrally formed with the leading edge. For example, if the leading edge is formed using additive manufacture a weakened region may define the insert, for example a cavity may be provided with ligaments extending between the insert and the leading edge.

The invention claimed is:

1. A turbomachine blade comprising:
   a metallic leading edge formed of at least two parts, the metallic leading edge having a bondline between the at least two parts, the bondline extending in a spanwise direction of the metallic leading edge; and
   a crack initiator located on the bondline, the crack initiator configured to selectively initiate cracking of the metallic leading edge along the bondline.

2. The turbomachine blade according to claim 1, wherein the crack initiator is provided at a tip of the turbomachine blade.

3. The turbomachine blade according to claim 1, wherein the crack initiator comprises a leading edge cap positioned at a tip of the turbomachine blade.

4. The turbomachine blade according to claim 3, wherein the cap is a wedge shaped insert having a reduced width in a direction from the tip of the turbomachine blade towards a root of the turbomachine blade, width being measured in a direction from a pressure side to a suction side of the blade.

5. The turbomachine blade according to claim 4, wherein the wedge shaped insert comprises planar sides angled to reduce the width of the insert.

6. The turbomachine blade according to claim 4, wherein the insert is shaped to converge towards the bondline.

7. The turbomachine blade according to claim 3, wherein the cap is bonded to the metallic leading edge.

8. The turbomachine blade according to claim 4, wherein the cap includes shoulders that are arranged such that, in a non-failure condition, the shoulders rest on a region of the metallic leading edge, the cap configured so as to shear from a remainder of the cap when a predetermined impact force is applied to the cap.

9. The turbomachine blade according to claim 1, wherein the metallic leading edge includes two wings and a fore portion positioned between the two wings.

10. The turbomachine blade according to claim 1, wherein the turbomachine blade comprises a composite core to which the metallic leading edge is attached.

11. The turbomachine blade according to claim 1, wherein the turbomachine blade is a fan blade for a gas turbine engine.

12. A gas turbine engine comprising the turbomachine blade according to claim 1.

* * * * *